W. Provines.
Excavator.

N° 16,397.  Patented Jan. 13, 1857.

UNITED STATES PATENT OFFICE.

WILLIAM PROVINES, OF COLUMBIA, MISSOURI.

EXCAVATOR.

Specification of Letters Patent No. 16,397, dated January 13, 1857.

*To all whom it may concern:*

Be it known that I, WILLIAM PROVINES, of Columbia, in the county of Boone and State of Missouri, have invented certain new and useful Improvements in Excavating and Casting Earth; and I do hereby declare the following to be a full, clear, and exact description of the same, reference being had to the accompanying drawings, making a part thereof, in which—

Figure 1:
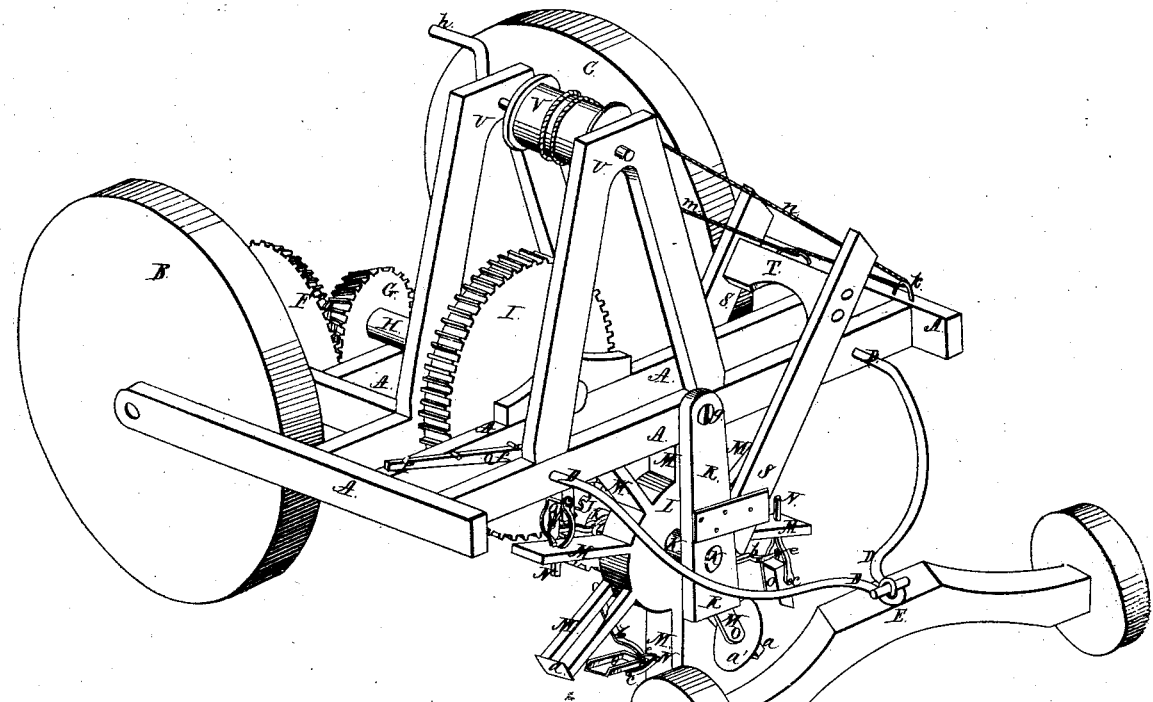
Figure 2:
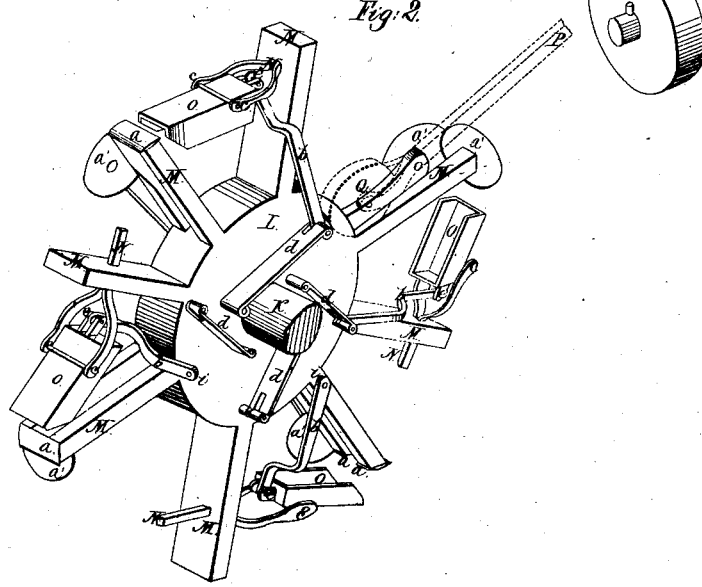

Figure 1, represents a perspective view of the machine, and Fig. 2, represents, a perspective view of the digging wheel, with the scoops arranged thereon.
Similar letters of reference where they occur in the separate figures denote like parts of the machine in both.

To enable others skilled in the art to make and use my invention, I will proceed to describe the same with reference to the drawings.

A, represents a frame supported at the rear by a pair of wheels B, C, of which the one B, is fast on the axle, so as to act as a driving, as well as a supporting wheel, and the other c, may be loose to facilitate the turning of the machine. The front part of the frame A, is supported by means of the braces D, to a truck E, to which the horses that draw the machine may be attached. The braces D, serve as hounds to direct the machine, or cause it to follow the truck.

On the axle of the wheels B, C, is arranged a bevel gear wheel F, which meshes with and turns another bevel gear G, on a shaft H, which is at right angles to, and extends forward of the main axle, that supports the gear F. On the forward end of the axle H, is a gear wheel I, which takes into and turns a pinion J, on the shaft or axle K, of the digging wheel L. The axle of the digging wheel, being parallel with the line of motion of the machine as it is drawn along, the digging wheel, upon said axle, revolves of course, in a line at right angles to said line of motion, and forward of the main supporting wheels B, C.

Upon the wheel L, are arranged a series of radial arms M, to which are connected, by means of a forked bracket N, a series of scoops O, each alternate arm carrying a cutting or digging blade, or blades a, a' and the intermediate arm a scoop O, as shown in the figures, especially Fig. 2, which is on an enlarged scale. The scoops follow the cutters closely, so as to catch and take up the earth loosened by said cutters. One set of these cutters may loosen the earth horizontally, and the other set (a') serve to loosen it from the land vertically. The scoops O, are pivoted or hinged at c, to the arms of the bracket N; and they are also pivoted at e to one end of an arm or bar b, the other end of said arm or bar being attached to a spring d, or to the wheel itself, as the kind of work to be done may require.

P (Fig. 1) is a lever pivoted at f, to the frame A, and has upon its lower end a friction roller Q (as shown in red in Fig. 2) which roller strikes the springs d, and compressing them, they in turn through the arms or bars d, change the position of the scoop o, so as to make it carry farther, or cast quicker, its load of earth. The lever P, being readily adjusted, and within the reach of the attendant, may be regulated at pleasure, so as to compress the springs d, more or less, and thus cause the scoops to hold the earth longer, or carry it up higher, before it is by the momentum of said wheel, cast from the scoop. If it is desirable to raise and cast the earth into a regular line, as in making an embankment, the arms b, may be disconnected from the springs d, at that end, and said arms attached to the wheel L, at the points i i, as shown in Fig. 2, the lever P, may then be shifted, so as to throw its wheel Q, which acts as a trigger, out of action. When so arranged the scoops will cast their charge, by the centrifugal action of the wheel, in a regular line. And when the earth is to be scattered promiscuously, the scoops may all have different inclinations, so as to cast at different points in their circuit.

The shaft K, of the digging wheel is hung to pieces R (one only being seen) which are provided at g to the frame A; and to the pieces R, are attached the levers S, S, united at their tops by a cross bar T. On the top of the pillar blocks U, U, is mounted a windlass or drum V, having upon it a crank h, and over this drum passes the cords or chains m, n, the one m, running directly to the cross bar T, of the levers, and the other one n, passing through the loop, or eye k, returns and is also connected to the cross bar T, so that by turning the drum V, in one direction, the digging wheel can be raised up, and out of gear with the wheel I, while the machine is being transferred from place to place; and by turning it in the opposite direction it can be brought into gear with the wheel I, and the strain on the cord or chain $n$, through the levers S, hold the two wheels in gear, while the machine is digging and casting its earth.

Having thus fully described the nature of my invention, what I claim therein as new, and desire to secure by Letters Patent is—

In combination with the scoops that cast their contents from them, the trigger Q and spring $d$, for the purpose of regulating the point at which the scoops shall divest themselves of their load, so as to raise it higher, or cast it farther from the trench that is being cut, as herein described.

WILLIAM PROVINES.

Witnesses:
 Jos. T. Fales,
 B. H. Dorsey.